March 7, 1967 S. E. LEHNHARDT 3,308,454

SYNCHRONOUS DIGITAL TO ANALOG CONVERTER

Filed March 27, 1964 2 Sheets-Sheet 1

INVENTOR.
Stanley Eugene Lehnhardt
BY
James O. Dixon

March 7, 1967 S. E. LEHNHARDT 3,308,454

SYNCHRONOUS DIGITAL TO ANALOG CONVERTER

Filed March 27, 1964 2 Sheets-Sheet 2

INVENTOR.
Stanley Eugene Lehnhardt
BY James O. Dixon

United States Patent Office 3,308,454

Patented Mar. 7, 1967

3,308,454

SYNCHRONOUS DIGITAL TO ANALOG CONVERTER

Stanley Eugene Lehnhardt, Dallas, Tex., assignor to Texas Instruments Incorporated, Dallas, Tex., a corporation of Delaware Filed Mar. 27, 1964, Ser. No. 355,508
1 Claim. (Cl. 340—347)

This invention relates to a digital-to-analog converter, and more particularly to a circuit for converting analog sample pulses interspersed with noise to an analog waveform.

It is the principal object of this invention to convert a signal from the analog sample pulse form to the analog form without distortion, in the analog form, due to noise occurring between the analog sample pulses.

Other objects, features and advantages of the invention will be apparent from the following detailed description taken in connection with the appended claim and attached drawing in which:

In the field of digital computation, it is often necessary to convert the electrical signal representing time-variant data from the digital form to the analog form. A common method of performing the conversion comprises the two steps of converting the signal from the digital form to analog sample pulse form and converting from analog sample pulse form to the analog form.

Figure 2:
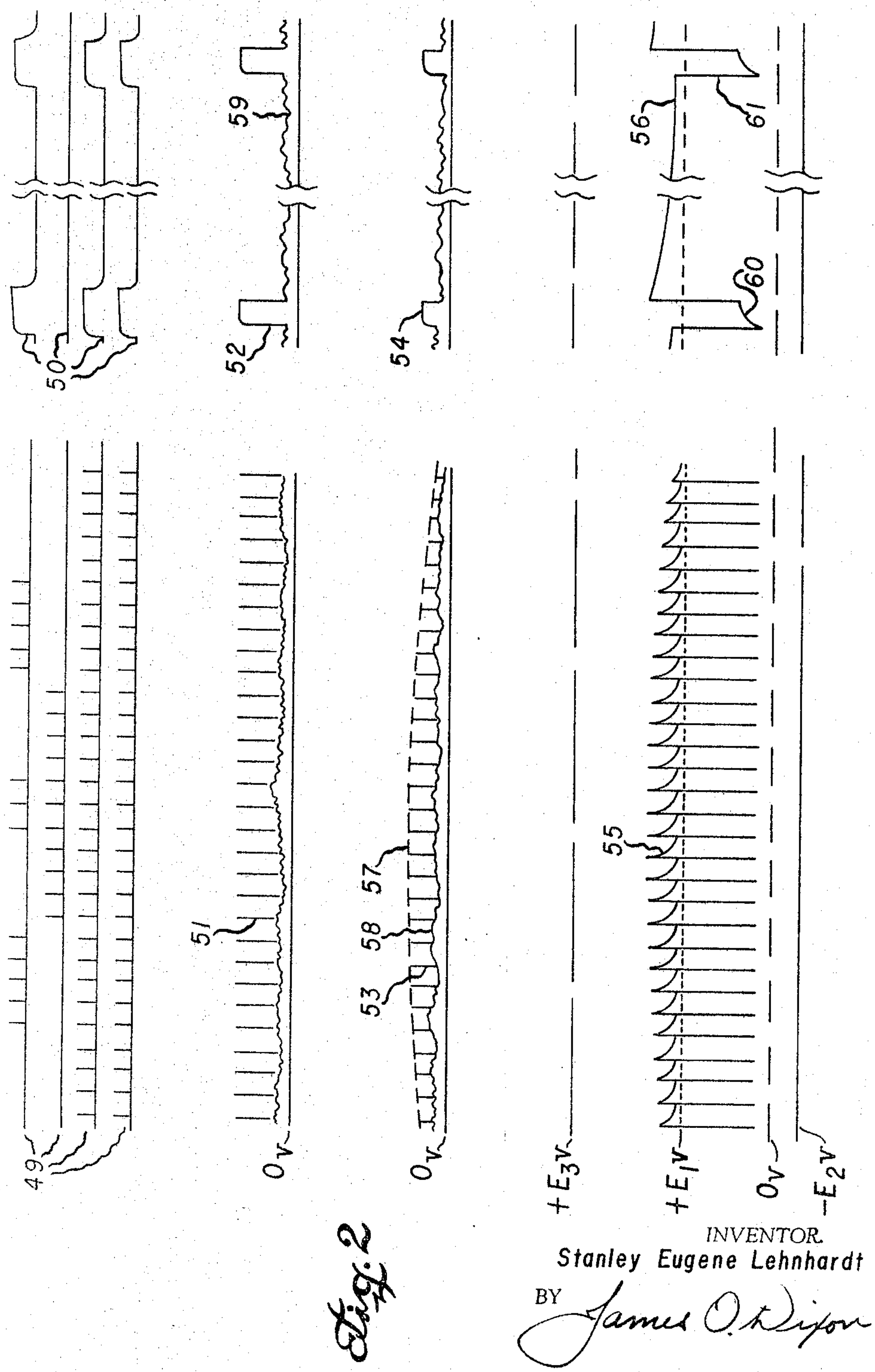
FIGURE 2 illustrates the waveforms of several voltages present in the converter of FIGURE 1.

The present invention performs the latter of the above steps in an improved manner which may be illustrated by making reference to waveforms of FIGURE 2. The waveforms 49 show the digital form of the electrical signal representing some given time-variant data. The digital form utilizes a signal on each of several conductors to represent the magnitude of the given data. The signal on each one of the conductors corresponds to a preselected bit of the binary representation of said magnitude. During each of the brief periods in which the binary representation appears on the group of conductors, each conductor carries a pulse or no pulse according to whether that bit of the binary representation is a one or a zero respectively. This simultaneously occurring group of bits is called a "word." In the process of converting to the analog form, the signal is converted first to analog sample pulse form, illustrated by waveform 53. The height of each pulse in waveform 53 is proportional to the number expressed by the corresponding word of the digital form shown as waveform 49. Thus waveform 53 is a succession of pulses, the heights of which express the time variation of the given data. The desired analog form of the signal, shown in dashed lines as waveform 57, has a magnitude which continuously follows the time variation of the given data. A good approximation of waveform 57 can be obtained from waveform 53 by utilizing the pulses of waveform 53 to charge a capacitor to a voltage dependent on the height of the charging pulse, which capacitor discharges so slowly that its voltage is almost a smooth waveform, such as waveform 57.

Such a method of converting from analog sample pulse form to analog form has the disadvantage that in an application wherein the noise 58 between the pulses of waveform 53 is as large as the smallest pulse to be converted, the noise will be passed by the circuit to the capacitor the same as a pulse and allowed to charge it, thus altering the output analog waveform from a true correspondence to the given data. The present invention employs the above conversion technique but with a novel improvement to make possible the conversion from analog sample pulse form analog form without distortion in the analog form due to the noise 58.

Figure 1:
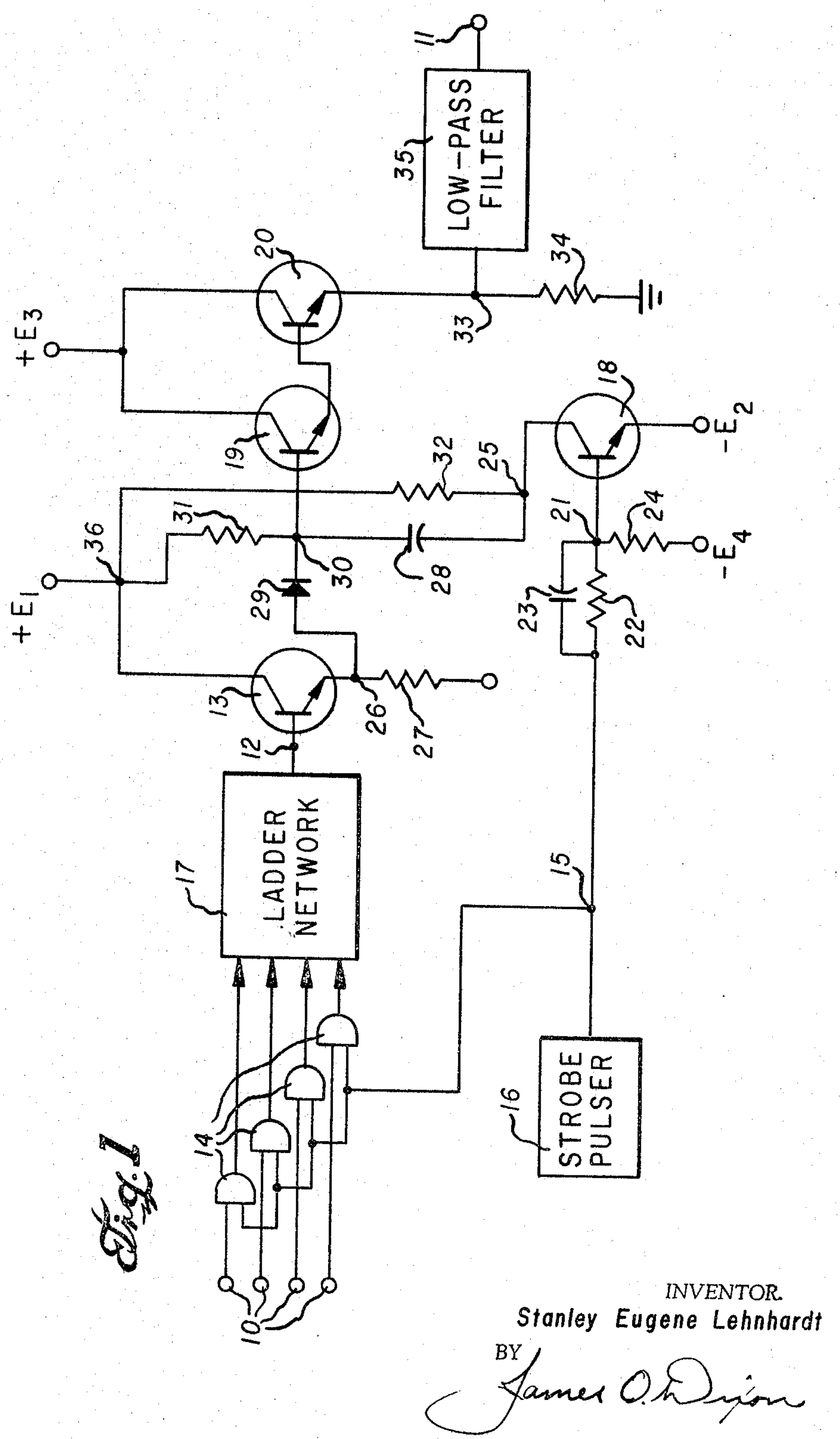
FIGURE 1 is a schematic diagram of a digital-to-analog converter according to the invention.

Referring now to FIGURE 1 and the several waveforms of FIGURE 2, the operation of the digital-to-analog converter of FIGURE 1 will be described. The function of the converter is to convert the digital voltages of waveform 49, applied at the inputs 10, to the corresponding analog voltage of waveform 57, which is obtained at output 11. The first step in the conversion is to produce the analog sample pulse voltage, shown by waveform 53 and measured at base 12 of transistor 13. The analog sample pulse voltage is then converted to the analog voltage of waveform 57.

To obtain the voltage of waveform 53, each of the digital voltages shown by waveform 49 (and on expanded time scale by broken waveform 50) is applied to one of the inputs 10. Thus the simultaneously occurring bits at inputs 10 correspond to a digital word. The voltages at the inputs 10 representing the succession of words shown in waveform 49 are connected to the inputs of conventional AND gates 14. Connected to the other input of each AND gate is the output terminal 15 of impulser 16, for example, a strobe pulser. The voltage at the latter terminal is a periodically occurring pulse shown by waveform 51 and on an expanded time scale by waveform 52. The strobe pulse rises from substantially zero potential to some constant positive voltage for a period concurrent with the application of pulses of waveform 50 to the AND gates 14. The width of the pulse is quite small compared to its repetition period; for example, it might be one microsecond wide and occur every 25 millisecond. When the strobe pulse does occur, each of the voltages at inputs 10 causes its corresponding AND gate to produce an output or no output according to whether that voltage is a pulse or the absence of a pulse. In this manner, the strobe pulse institutes the transfer of the word occurring at inputs 10 to the ladder network 17.

The potential integrator or ladder network 17 is of the conventional sort wherein the bits of the input word are used to activate switches connecting resistances of weighted values into a voltage divider circuit in such a way that the voltage output of the voltage divider is proportional to the number expressed by the input word. Such a function is performed, for example, by the 1561 Digital-to-Analog Converter Network produced by Digital Equipment Corporation, Maynard, Mass. Such networks are usually arranged to present an output impedance which is independent of the input to the network. Since the voltage divider output appears at the output of the ladder network 17 for the duration of the strobe pulse, said output is a succession of pulses coextensive in time with the strobe pulses and having a magnitude determined by the word transferred to ladder network 17 from inputs 10. This is the analog sample pulse voltage, measured at base 12 of transistor 13 and illustrated by waveform 53 and, on an expanded time scale, by waveform 54. The analog sample pulse voltage rises from substantially zero potential to positive values. The duration of each analog sample pulse is not exactly that of the strobe pulse, due to non-zero switching times inherent in the operation of the AND gates 14 and the ladder network 17, but the difference in duration is negligible compared with the total length of either pulse.

That portion of the digital-to-analog converter of FIGURE 1 comprised of transistors 13, 18, 19 and 20 achieves a first approximation of the desired analog voltage shown in waveform 57 by causing the analog sample pulses to charge a capacitor 28 in a circuit of large time constant to obtain a more nearly continuous waveform rather than a succession of pulses. As mentioned above, it was recognized in connection with the present invention that such a processing of the analog sample pulse form of the signal can be a source of distortion in the output analog form of the signal when between the analog sample pulses there exists sufficient noise to charge the capacitor. It was thought that this distortion could be eliminated if means were provided for charging the capacitor with the analog sample pulse voltage only during the occurrence of the analog sample pulses and not between pulses. It is by the provision of such means that the converter of FIGURE 1 eliminates the noise between pulses as a source of distortion.

The manner by which charging is effected only during the occurrence of the analog sample pulses is illustrated by a consideration of waveforms 52, 54 and 56 in connection with FIGURE 1. The output of strobe pulser 16, shown by waveform 52, is applied to the base 21 of transistor 18 through input resistor 22 and speed-up capacitor 23. Bias resistor 24 is connected from base 21 to a source of negative potential, $-E_4$, more negative than $-E_2$, and the values of resistors 24 and 22 and capacitor 23 are so selected that transistor 18 will be switched on by the strobe pulses but not by any noise 59 which might be present between strobe pulses. Capacitor 23 accomplishes a fast switching of transistor 18 in response to the strobe pulse, since voltage transients incident to the leading and the trailing edges of the strobe pulse applied at terminal 15 are passed to the base 21, unattenuated by resistor 22. Since transistor 18 acts as an electronic switch connecting its collector 25 to the potential $-E_2$ for the duration of the strobe pulse, it operates in "saturation" during conduction in order to allow the flow of the maximum collector current required of the switch while maintaining a very low collector-emitter voltage.

As the rise of the strobe pulse voltage at terminal 15 turns on transistor 18, the analog sample pulse voltage of waveform 54 simultaneously rises from zero to a positive value at base 12 of transistor 13. The rise of the voltage at base 13 causes an accompanying voltage rise at emitter 26, since transistor 13 is connected in an emitter follower circuit, it being connected by its collector to the positive potential $+E_1$ at terminal 36 and by its emitter 26 through resistor 27 to potential $-E_2$. Thus, while collector 25, one terminal of capacitor 28, is held at a voltage close to $-E_2$ because of the conduction of transistor 18, the voltage at emitter 26 has, practically, the positive value attained by the analog sample pulse at base 12.

Connected across the potential difference between emitter 26 and collector 25 is the series combination of diode 29 and capacitor 28. Current charging capacitor 28 flows from emitter 26 to collector 25 via diode 29 at a very high rate, since diode 29 offers little resistance. The voltage at terminal 30, will almost have reached the voltage at emitter 26 when the strobe pulse and analog sample pulse cease. As to other occurrences in the circuit before the pulses do shut off, it is to be remarked that there is a small amount of charging of capacitor 28 from potential $E_1$ through resistor 31. However, since resistor 31 is quite large, the current through it plays no substantial part in the charging. Also noteworthy is the fact that some current flows into the base of transistor 19 rather than to capacitor 28; however, for reasons to be described more fully below, this base current is so small as to be negligible during charging. During charging, the resistor 32 merely carries current flowing from the source of potential $+E_1$ through transistor 18 to the source of potential $-E_2$.

Focusing on the charging flow of current from emitter 26 through diode 29 and capacitor 28 to collector 25, it will be recognized that the magnitude of $-E_2$ is chosen so that the voltage at collector 25 during charging will be workably more negative than the smallest analog sample pulse voltage appearing at emitter 26; $+E_1$ should be enough larger than the largest analog sample pulse voltage at base 12 for transistor 13 to operate in the desired operating range.

The combination of the two transistors 19 and 20 with the emitter of one connected to the base of the other is called a Darlington amplifier. The arrangement of the two with collectors connected together is equivalent to a single transistor having a current gain from the base terminal 30 to the emitter 33 which is roughly the product of the individual current gains of the separate transistors. Such a high gain enables the amplifier to supply a reasonable current load at emitter 33 while requiring little current into the base of transistor 19. The combination of transistors is here connected by the collectors to positive potential $+E_3$ and by emitter 33 through resistor 34 to ground to form an emitter follower circuit. The use of the high current gain in the emitter follower circuit provides an input impedance to the amplifier at terminal 30 which is many multiples of the resistance 34; hence the current drawn from terminal 30 into the base of transistor 19 is extremely small. As with the normal emitter follower, the output voltage at emitter 33 is very nearly the voltage at the input, terminal 30, the voltage drop across the two base-emitter junctions being quite small. Thus the voltage at emitter 33, shown by waveform 55 and on an expanded time scale by waveform 56 is, practically speaking, the voltage as measured at terminal 30. For instance, the increase in the voltage at terminal 30 due to the charging of capacitor 28 is present at emitter 33, as shown by the rise 60 in waveform 56.

As illustrated in waveform 56, when the strobe pulse of waveform 52 cuts off, the voltage at terminal 30 has almost reached the level of the voltage at emitter 26. At the cessation of the strobe pulse, transistor 18 turns off, leaving collector 25 no longer connected to a fixed potential, but free to seek whatever voltage level occurs as a result of the discharge current flowing through the loop formed by resistor 32, capacitor 28 and resistor 31. Since capacitor 28 was charged in such a way that terminal 30 is positive and collector 25 is negative, the discharge current of said capacitor flows through resistor 31 from terminal 30 to terminal 36, then through resistor 32 from terminal 36 to collector 25. With the current flowing in this direction, terminal 30 will have a more positive potential than that of terminal 36, potential $+E_1$. The time constant of the discharge circuit is selected so that the voltage at terminal 30 does not decrease below potential $+E_1$ before the strobe and analog pulses reoccur. The noise voltage appearing at base 12, though possibly larger than the smallest analog sample pulses, is well below the potential $+E_1$. Therefore, diode 29 is reverse biased and non-conducting during the discharge, allowing no noise voltage to pass terminal 30.

As during the period of charging, the current into the base of transistor 19 from terminal 30 is small due to the extremely high input impedance at the base of said transistor. Practically, then, the discharge behavior of the circuit is that of capacitor 28 discharging through resistors 31 and 32 with the voltage at terminal 30 being the sum of potential $+E_1$ and the IR drop across resistor 31, said voltage at terminal 30 being transmitted to terminal 33 by the Darlington amplifier with little current drain from the discharge circuit. The time constant of the discharge circuit is substantially determined by the values of capacitor 28 and resistor 31, said resistor being very much larger than resistor 32. It is apparent that potential $+E_3$ must be enough larger than potential $E_1$ to provide the proper collector voltage for transistors 19 and 20 as the voltage at terminal 30 rises above potential $E_1$ during discharge.

Before the decaying voltage at terminal 30 reaches the level of potential $+E_1$, the strobe pulse and analog sample pulse reoccur, switching on transistor 18 and causing the voltage at emitter 26 to rise, respectively. These occurrences cause the sharp drops 61 seen in waveform 66 and the resumption of charging capacitor 28.

In order to obtain the analog voltage of waveform 57 from the voltage of waveform 56, additional smoothing is applied by the conventional low pass filter 35. The cut-off frequency of filter 35 is selected so as to pass the frequencies present in waveform 57 but reject the frequencies of waveform 56 in the range of the repetition frequency of the analog sample pulses and above. Because the converter of FIG. 1 does not allow conversion from the analog sample pulse form to analog form except during the analog sample pulses, distortion in waveform 57 due to between-pulse noise is eliminated.

It is to be understood that the above described circuit arrangement is merely illustrative of the application of the principles of the invention. Numerous other arrangements may be devised by those skilled in the art without departing from the spirit and scope of the invention as defined by the appended claim.

What is claimed is:

A digital-to-analog converter responsive to electrical signals including analog sample pulses comprising, a source of other pulses coincident with said analog sample pulses, switch means responsive to be closed by said other pulses, first and second sources of fixed potential, a capacitor connected by one terminal through said switch means to said first source of fixed potential, a diode connected from an input terminal of said electrical signals to the other terminal of said capacitor, and a resistance path connected between the terminals of said capacitor and having said second source of potential connected in said path, whereby said diode is rendered conductive only when one of said analog pulses and one of said other pulses in synchronous timed relation therewith are present.

References Cited by the Examiner

UNITED STATES PATENTS 2,532,338 12/1950 Schlesinger ---------- 329—109

MAYNARD R. WILBUR, *Primary Examiner.*

JAMES WALLACE, *Assistant Examiner.*